United States Patent [19]
Tsai

[11] Patent Number: 5,589,854
[45] Date of Patent: Dec. 31, 1996

[54] TOUCHING FEEDBACK DEVICE

[76] Inventor: Ming-Chang Tsai, Fl. 12th, No. 138, Sec. 2, King San South Road, Taipei, Taiwan

[21] Appl. No.: 493,547

[22] Filed: Jun. 22, 1995

[51] Int. Cl.$^6$ .................................................. G09G 5/08
[52] U.S. Cl. .......................... 345/161; 200/6 A; 338/128
[58] Field of Search .................................. 345/156, 157, 345/161, 163, 167; 74/741 X Y, 490.10; 273/148 B, 438; 200/6 A; 338/128

[56] References Cited

U.S. PATENT DOCUMENTS

| | | | |
|---|---|---|---|
| 3,394,611 | 7/1968 | Bearner | 74/471 X Y |
| 4,620,176 | 10/1986 | Hayes | 338/128 |
| 4,634,941 | 1/1987 | Klimo | 318/139 |
| 5,107,080 | 4/1992 | Rosen | 338/128 |
| 5,230,059 | 7/1993 | Nielson et al. | 345/161 |
| 5,473,325 | 12/1995 | McAlindon | 345/161 |

Primary Examiner—Kee M. Tung
Assistant Examiner—Matthew Luu
Attorney, Agent, or Firm—Morton J. Rosenberg; David I. Klein

[57] ABSTRACT

A tactile feedback device is provided. The device includes a joystick assembly with a joystick handle and a pair of perpendicular yoke components installed below the joystick handle. Each yoke component has a driving motor installed for driving the joystick handle. The device also includes a force feedback controlling system used for producing the force of a simulated condition, and to provide a relative average current to the motors for obtaining a relative rotating speed. The joystick can thereby produce different displacements of the joystick handle at the same time, and the operator can feel the different reaction forces produced. The device includes an automatic reset function using a pair of sensors respectively installed on the yoke components. The joystick handle can be automatically reset to the zero position of each when the sensors are not aligned with respective light blocking members.

1 Claim, 5 Drawing Sheets

TOUCHING FEEDBACK DEVICE

BACKGROUND OF THE INVENTION

This invention relates to a tactile feedback device that may be used in a joystick, in which the operator can feel the force of every condition from the joystick through the feedback by this device.

In operating a conventional simulator, the simulation effect is achieved from the sound and the image provided, but the reality of such simulation is not completely reflected from such effects, so a device which can more accurately simulate reality is needed.

PRIOR ART

The known prior art, such as seen in U.S. Pat. No. 5,184,319, entitled "Force Feedback and Textures Simulation Interface Device" issued Feb. 2, 1993 to Kramer, James, discloses a touching glove in which a line is installed between the fingertip and the wrist for producing a resistance to the fingertip when the finger is moving. Thus, the fingertip can really feel the condition of holding something. Meanwhile, a vibrator is installed on the fingertip for simulating the condition of touching a rough surface.

The aforesaid simulator is very complex in structure and inconvenient to use. For example, a ferrule must be worn on each finger, and the movement is retarded because of the restraint of the line. Ten ferrules and ten lines are individually connected to controllers and the sensors. In cooperation with software, a relative force is transmitted to the finger of the operator from the driving device. Such a complex structure increases not only the cost, but also the rate of breakdown. The installation is also inconvenient, and the most important drawback is that it simulates only the condition of holding something.

SUMMARY OF THE INVENTION

The main object of this invention is to provide a tactile feedback device including a joystick assembly with a joystick handle. The device includes a pair of perpendicular yoke components installed below the joystick handle and equipped with the motors for driving the joystick. A force feedback controlling system is provided for producing the force of a simulated condition, and then supplying the motors with a relative current for obtaining a relative rotating speed. The joystick has different displacements at the same time by the driving of the motors, so the operator can feel different reaction forces which are fed back from the simulation.

A further object of this invention is to provide a tactile feedback device which can really reflect the force of a simulated condition to the operator through a simple structure, that is lower in cost, easier to assemble, and more convenient to use. The invention can not only be used in many video games and training simulators, but also installed on such devices as wheelchairs. The operator can thereby feel a more real feedback force while operating it.

Another object of this invention is to provide a tactile feedback device that includes an automatic reset function to return the joystick to its original position with a pair of sensors respectively installed on the yoke components, so the joystick can automatically rotate to the original zero location when the sensors are not sensing an aligned condition.

DETAILED DESCRIPTION OF THE PREFERRED EMBODIMENTS

Figure 1:
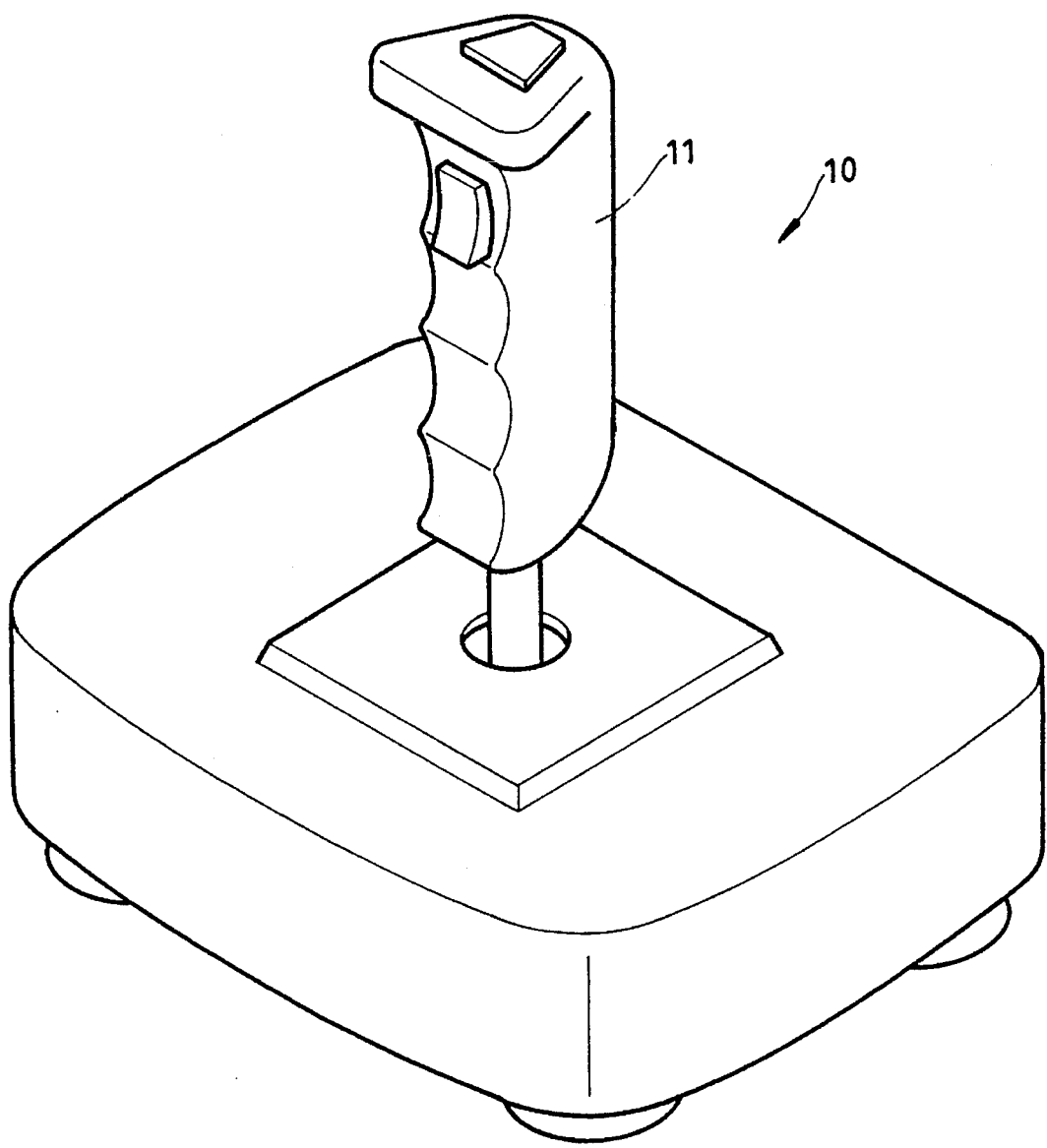
FIG. 1 is a perspective view of the joystick assembly of the present invention.
Figure 2:
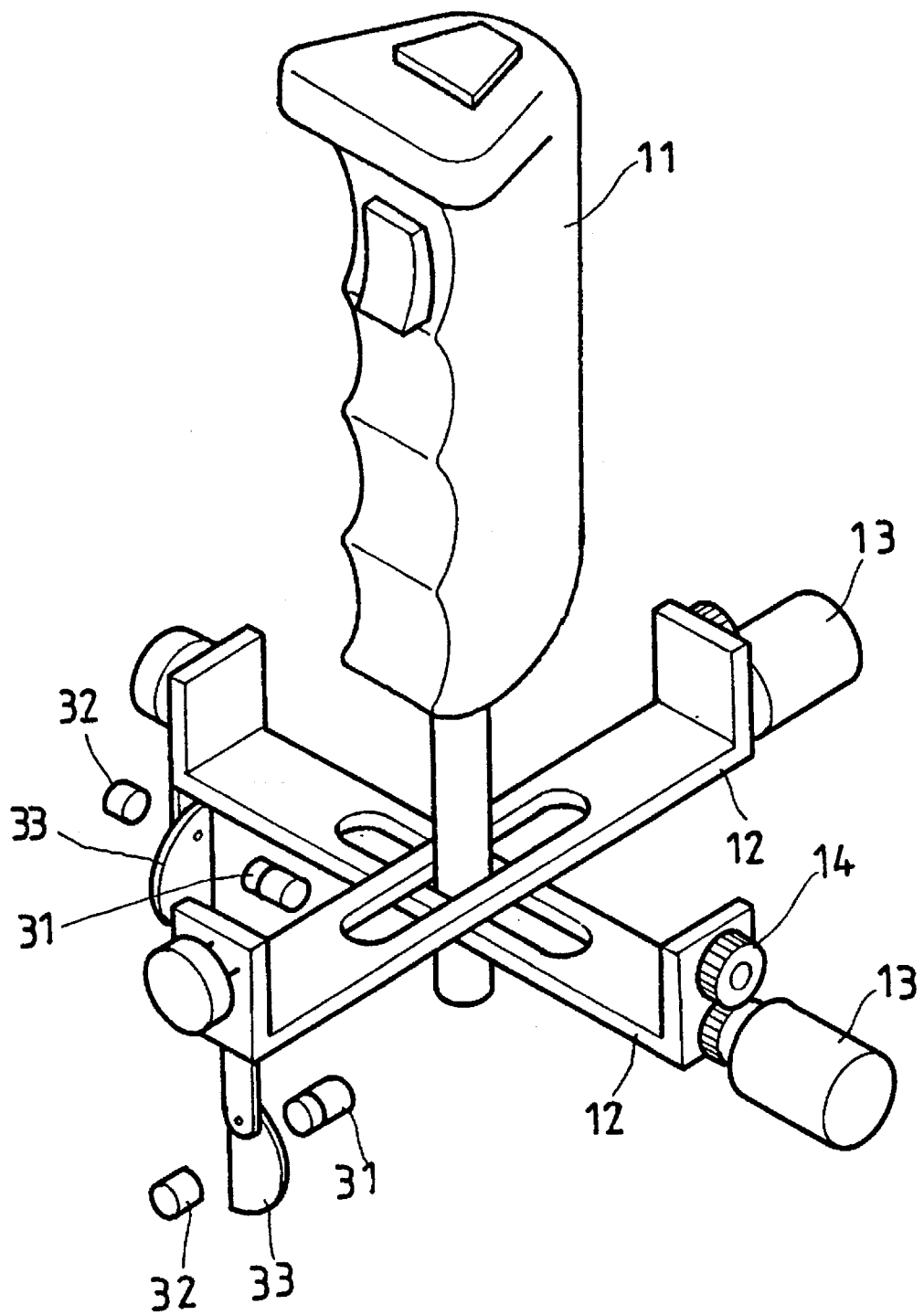
FIG. 2 is a perspective diagram of the yoke components showing the light source and the light receiver of the automatic reset function.

As shown in FIGS. 1 and 2, the tactile feedback device includes the joystick assembly 10 with a joystick handle 11 and a pair of yoke components 12 installed below the joystick handle 11. Each yoke component 12 is connected with a driving motor 13 through the reduction gears 14, and a slot is formed on the center of the yokes 12 for displacing the joystick handle 11. The joystick handle 11 is driven to move longitudinally and transversely when the shaft of the driving motor 13 of each yoke component is rotated.

Figure 3:
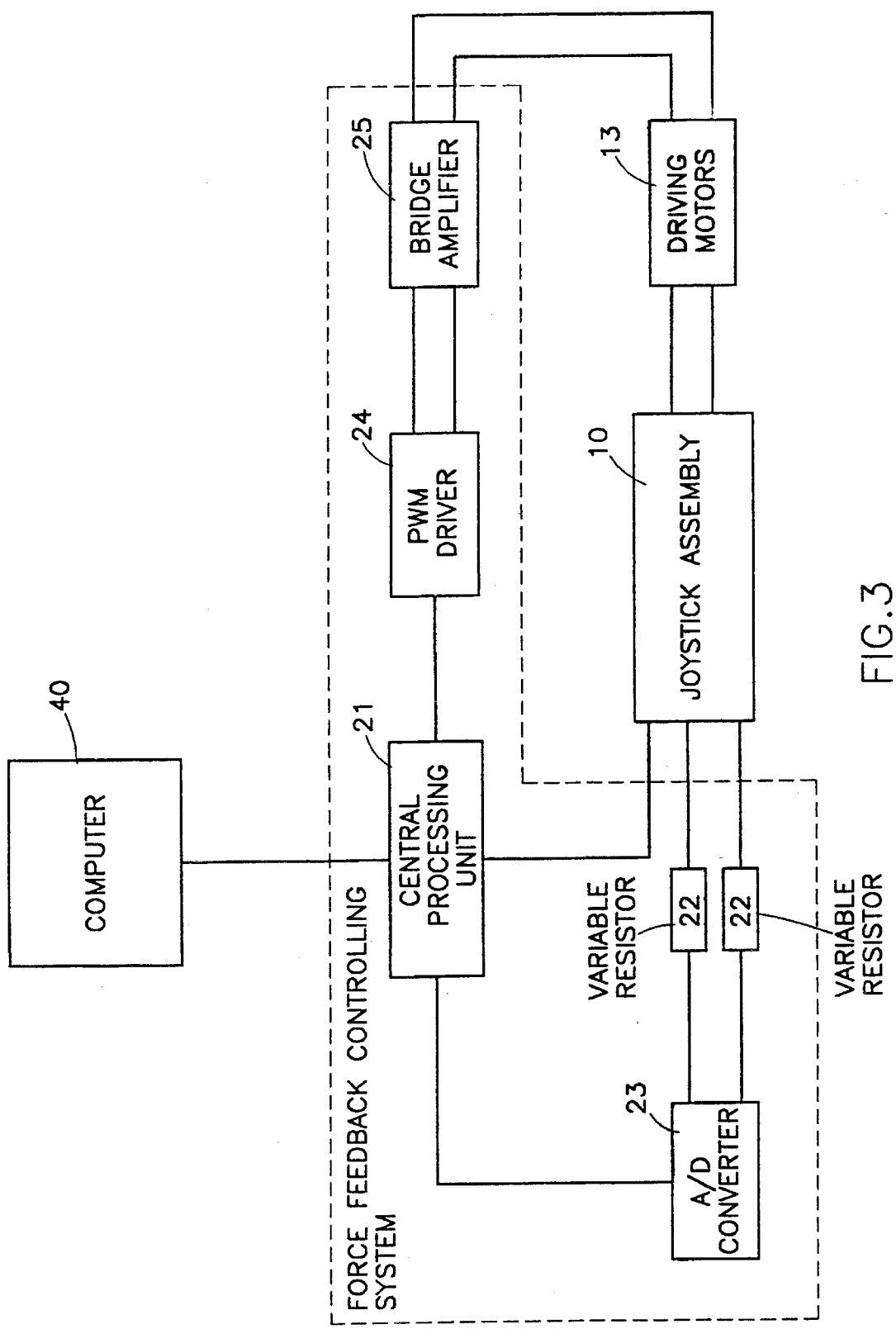
FIG. 3 is a block diagram of the force feedback system of the present invention showing the connection of the feedback system, joystick assembly, and the computer; and, FIG. 4 is a circuit diagram of the force feedback controlling system.
Figure 4A:
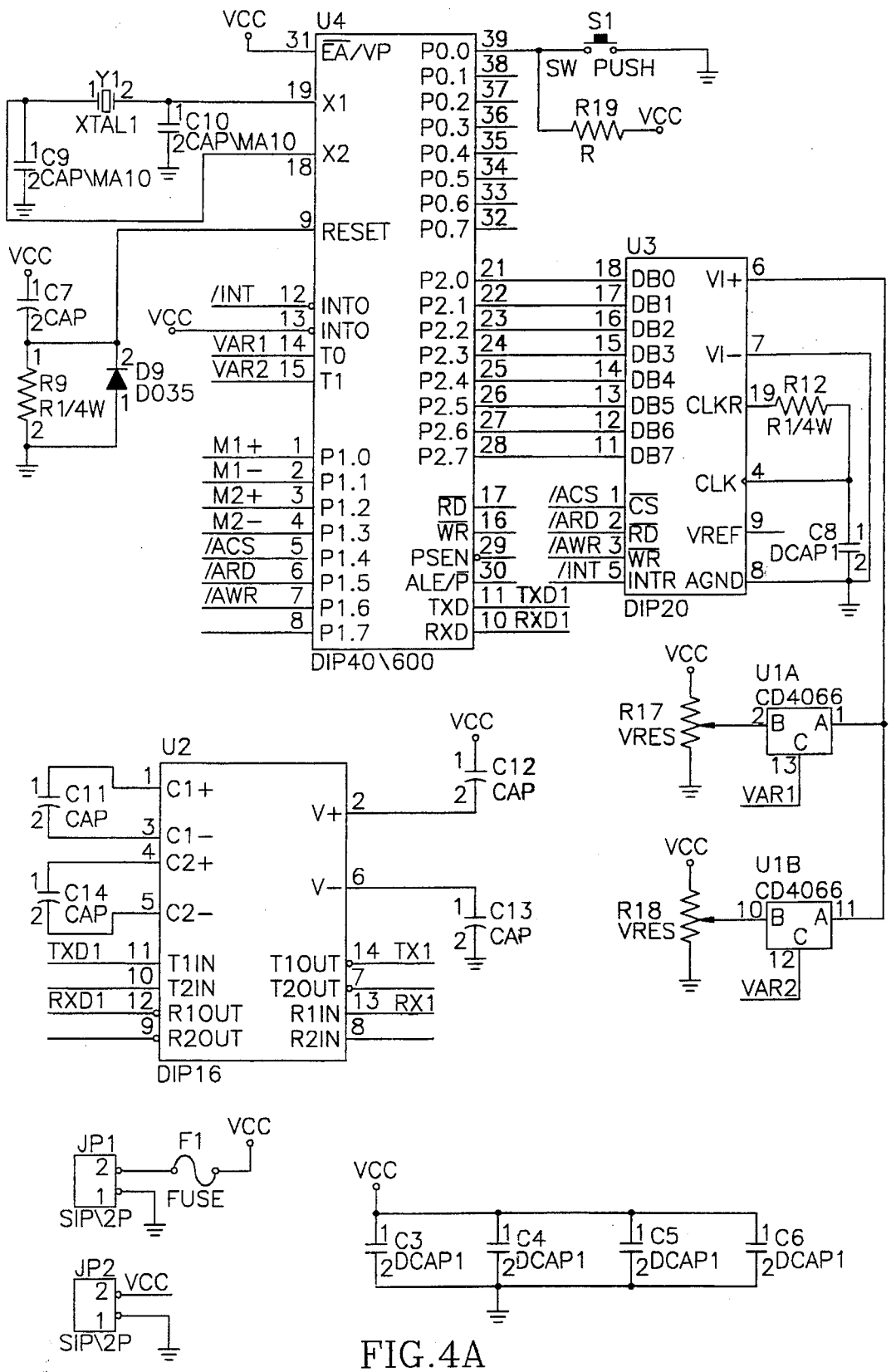
Figure 4B:
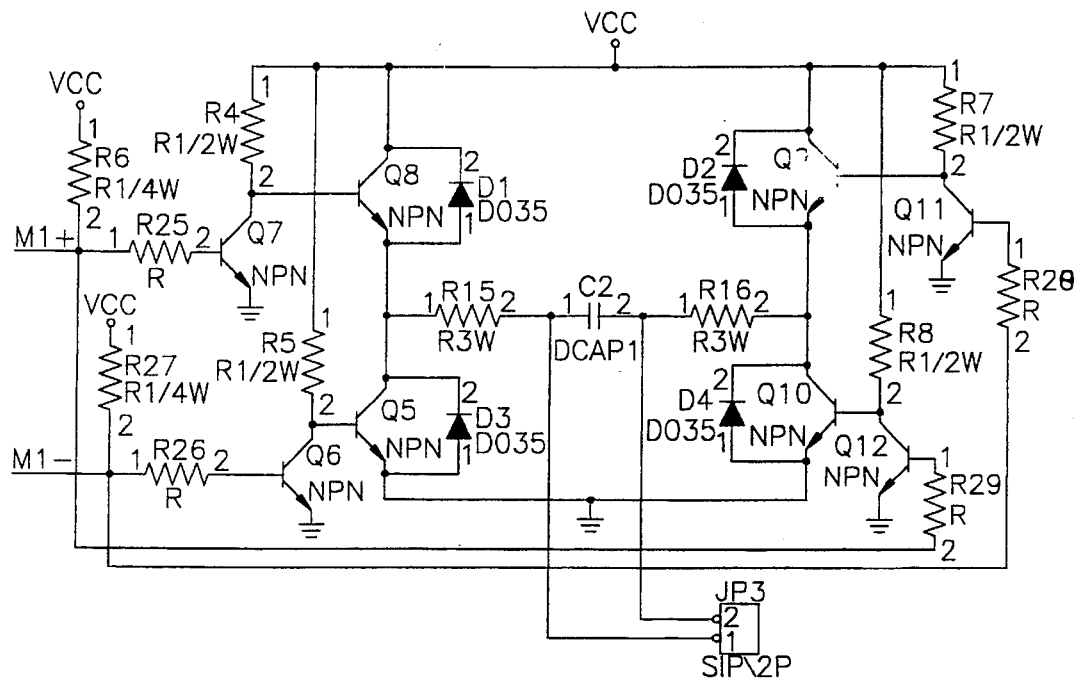
Figure 4B:
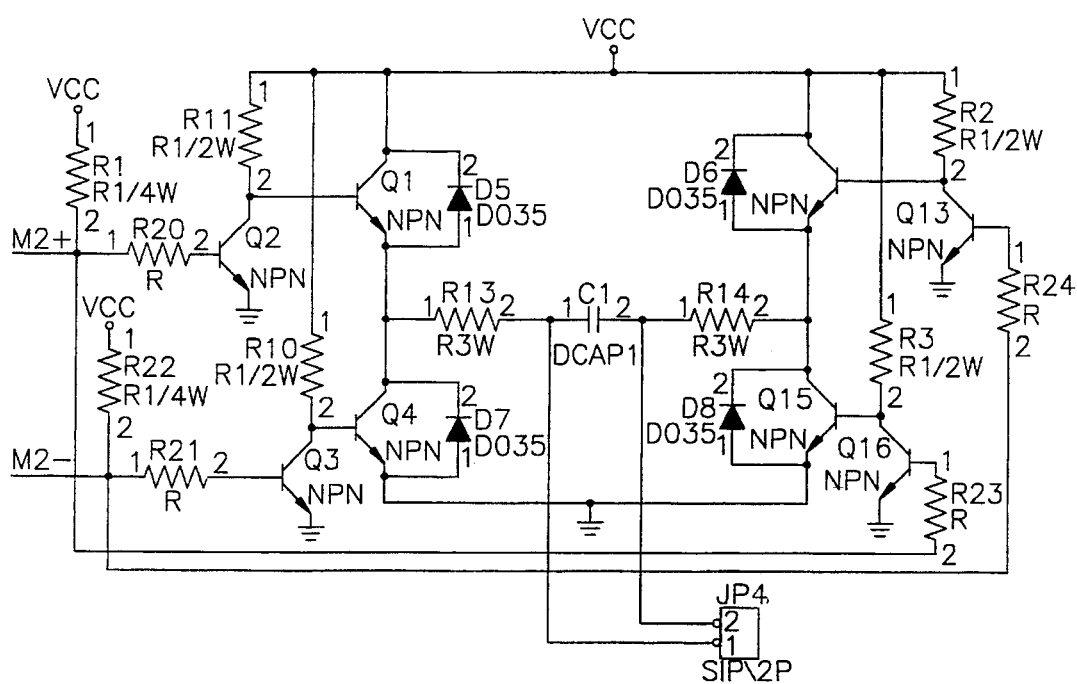

As illustrated in FIGS. 3 and 4, the force feedback controlling system 20 includes a central processing unit 21. This unit can receive the joystick position signals transmitted from the joystick assembly 10 through the variable resistance 22 and the A/D converter 23. The variable resistance 22 produces different voltages corresponding to the displacement of the joystick handle 11, thereby identifying the different locations of the joystick handle 11. Such voltages are analog signals, they are converted to digital signals by the A/D converter 23 and then decoded by the central processing unit 21, along with the firing signal of the joystick assembly 10. The digital signals are also combined to become an instruction, that is transmitted to the computer 40 through an RS232 interface. Meanwhile, the instruction for simulating a condition is received by the RS232 interface from the computer 40. After the instruction is read and decoded by the central processing unit 21, the (PWM) pulse width modulation driver 24 and the bridge amplifier 25 are connected to the driving motors 13 of the joystick assembly 10 for controlling the rotation of the motors 13. The driving motors 13 receive different average currents from the feedback controlling system 20 by providing current for different time intervals within a particular time period. In other words, the driving motors 13 rotate at a higher speed when they receive a higher average current, and vice versa. When a driving motor 13 has a higher rotating speed in a particular direction, there is a larger displacement. In other words, the joystick 11 receives larger feedback force.

Simplifying the foregoing description, the tactile feedback device can easily be connected to the computer 40 through a conventional RS232 interface, and does not need to be connected to many interface cards. The feedback force of the simulating condition is rapidly and accurately reflected by the yoke components 12, wherein the operator can feel the feedback force only by holding the joystick handle 11. It is therefore more convenient than prior art systems, because the use of the finger-like ferrule is eliminated. For the designer of the simulation system, all the designer has to do is to read and give instructions to the tactile feedback device.

Referring to FIG. 2, this tactile feedback device includes an automatic reset function, in which a light source 31 and a light receiver 32 are respectively installed on the inner and outer sides of one end of each yoke component 12, the light source and light receiver being disposed opposite to each other. The block board 33 extends downwardly from the end of the yoke component, between the light source 31 and the light receiver 32. The block board of each yoke can block the light of the respective light source 31 at some angles, and then the respective light receiver 32 cannot receive the light of that light source 31. The accurate zero position for each yoke is set at the position where the respective block board 33 blocks a portion of the light. When the power is turned on, if either light receiver 32 cannot receive the light of the respective light source 31 because it is blocked by the block board 33, it indicates that the joystick handle 11 is displaced from the zero position. Under such conditions, the driving motor 13 associated with the respective yoke is automatically driven in a particular direction, until the respective light receiver 32 receives the light from the light source 31. In other words, the joystick handle is returned to the zero position of each yoke. If the joystick handle 11 is displaced from the zero position of either yoke in s direction opposite to that just discussed, the respective light receiver 32 will receive a greater amount of the light of the respective light source 31 when the power is turned on. The respective driving motor 13 will then be automatically driven in a direction to reduce the light transmission, until the light of the light source 31 is blocked by the block board 33. In other words, the joystick handle 11 is returned to the zero position for each of the two yokes. If the joystick handle 11 is already at the correct zero position of a respective yoke when the power is turned on, the condition of the respective light receiver 32 is immediately detected when the corresponding driving motor 13 intends to rotate, and that rotation movement is stopped quickly for maintaining the joystick handle at the zero position of the respective yoke.

Thus, whatever position the joystick handle 11 is at, it can be automatically returned to the zero position by the action of the automatic reset function when the power is turned on. This locating function is not only accurate, but also convenient.

Having described preferred embodiments of a new and improved design for the feedback device in accordance with the present invention, it is believed that other modifications, variations and changes will be suggested to persons skilled in the art in view of the teachings set forth herein. It is therefore to be understood that all such variations, modifications and changes are believed to fall within the scope of the present invention as defined by the appended claims.

I claim:

1. A tactile feedback device, comprising:

a joystick assembly having a joystick handle and a pair of orthogonally disposed yoke components installed adjacent a bottom end of said joystick handle and adapted for corresponding displacement therewith, each of said yoke components having a driving motor connected to one end thereof through reduction gears and a variable resistor coupled to an opposing end of said yoke for generating a position signal, said pair of yokes being displaceable responsive to rotation of said driving motors for corresponding displacement of said joystick handle; and a force feedback controlling system including (1) a central processing unit connected to a computer, (2) an A/D converter having a pair of inputs respectively coupled to said variable resistors of said pair of yokes and an output coupled to said central processing unit for converting respective position signals to digital signals, (3) a PWM driver circuit having an input coupled to said central processing unit, and (4) a bridge amplifier having an input coupled to said PWM driver and a pair of outputs respectively coupled to said driving motors, each of said driving motors receives a relative average current according to a simulation condition established by the computer for obtaining a relative rotating speed thereof to generate a relative feedback force to said joystick handle.

* * * * *